US012803217B2

(12) United States Patent
Moerth

(10) Patent No.: US 12,803,217 B2
(45) Date of Patent: Nov. 17, 2026

(54) CONNECTION DEVICE FOR ROTATING SUBASSEMBLY OF A MOTOR VEHICLE AND ROTATING SUBASSEMBLY

(71) Applicant: Bayerische Motoren Werke Aktiengesellschaft, Munich (DE)

(72) Inventor: Philip Moerth, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 139 days.

(21) Appl. No.: 19/002,923

(22) Filed: Dec. 27, 2024

(65) Prior Publication Data

US 2025/0239807 A1 Jul. 24, 2025

(30) Foreign Application Priority Data

Jan. 19, 2024 (DE) ..................... 10 2024 101 576.4

(51) Int. Cl.
*H01R 13/622* (2006.01)
*H02K 1/26* (2006.01)
(Continued)

(52) U.S. Cl.
CPC ............. *H01R 13/622* (2013.01); *H02K 1/26* (2013.01); *H02K 3/28* (2013.01); *H02K 13/02* (2013.01)

(58) Field of Classification Search
CPC ...... H01R 13/622; H01R 13/02; H01R 13/40; H01R 13/502; H01R 13/748; H01R 31/06;
(Continued)

(56) References Cited

U.S. PATENT DOCUMENTS 5,145,219 A * 9/1992 Babuder ............. F16L 19/0212 285/379
6,236,128 B1 * 5/2001 Dragash, Jr. ........... H02K 13/02 310/85
(Continued)

FOREIGN PATENT DOCUMENTS

DE 10 2021 123 305 A1 3/2023
DE 102021213126 A1 * 5/2023 ............... H01R 4/56

OTHER PUBLICATIONS

German-language Search Report issued in German Application No. 10 2024 101 576.4 dated Oct. 2, 2024 with partial English translation (11 pages).

*Primary Examiner* — Ahmed Elnakib
(74) *Attorney, Agent, or Firm* — Crowell & Moring LLP

(57) ABSTRACT

A connection device for a rotating subassembly for connecting a first electrical component arranged in a hollow shaft to a second electrical component arranged outside the hollow shaft. The connection device includes a sleeve for arranging in a radial leadthrough of a wall of the hollow shaft; a wire-like conductor arranged in regions in the sleeve, wherein conductor ends projecting at edges of the sleeve form contact regions for contacting the first and second electrical components; an electrically insulating covering surrounding the conductor inside the sleeve and which is arranged between an outer side of the conductor and an inner side of the sleeve, wherein, the conductor has a first undercut to produce a radially positive-locking connection between the conductor and the covering, and the covering has a second undercut to produce a radially positive-locking connection between the covering and the sleeve.

10 Claims, 2 Drawing Sheets

(51) Int. Cl.
*H02K 3/28* (2006.01)
*H02K 13/02* (2006.01)

(58) Field of Classification Search
CPC ............ H01R 2201/10; H01R 2201/26; H02K 1/26; H02K 3/28; H02K 1/28; H02K 3/50; H02K 13/02; B60R 16/02
USPC ............................................................ 310/71
See application file for complete search history.

(56) References Cited

U.S. PATENT DOCUMENTS

| | | | | |
|---|---|---|---|---|
| 7,581,913 | B2 * | 9/2009 | Ordonio, Jr. | F16B 37/14 411/533 |
| 10,680,499 | B2 * | 6/2020 | Strasinsky | H01R 39/08 |
| 11,411,347 | B2 * | 8/2022 | Wu | H01R 24/50 |
| 2023/0043493 | A1 * | 2/2023 | Beck | H01R 39/08 |
| 2024/0170888 | A1 * | 5/2024 | Su | H01R 13/6271 |
| 2025/0239807 | A1 * | 7/2025 | Moerth | H02K 3/28 |

* cited by examiner

CONNECTION DEVICE FOR ROTATING SUBASSEMBLY OF A MOTOR VEHICLE AND ROTATING SUBASSEMBLY

CROSS REFERENCE TO RELATED APPLICATION

This application claims priority under 35 U.S.C. § 119 from German Patent Application No. DE 10 2024 101 576.4, filed Jan. 19, 2024, the entire disclosure of which is herein expressly incorporated by reference.

BACKGROUND AND SUMMARY

The invention relates to a connection device for a rotating subassembly of a motor vehicle for electrically connecting a first electrical component, which is arranged in a hollow shaft of the subassembly, of the subassembly to a second electrical component, which is arranged outside the hollow shaft, of the subassembly. The invention further relates to a rotating subassembly of a motor vehicle.

In this instance, the interest is directed toward rotating subassemblies for motor vehicles, for example, rotors for electric drive machines. Such rotating subassemblies may have, for example a hollow shaft in which a first electrical component is arranged. In order to electrically connect this first electrical component to a second electrical component outside the rotor shaft, the hollow shaft is provided with an electric interface which has to withstand loads which are caused by rotation, for example, centrifugal forces. In the case of a rotor, the first electrical component may be, as set out in DE 10 2021 123 305 A1, a slip ring module which is arranged in a rotor shaft for energizing the second electrical component in the form of a rotor winding of the rotor. The rotor shaft may have line openings, through which connection lines are guided. These connection lines are contacted inside the rotor shaft with, for example, fork-like contact elements.

An object of the present invention is to provide an electric interface, which is mechanically particularly stable and which can readily be secured to a hollow shaft, for a rotating subassembly of a motor vehicle.

This object is achieved according to the invention by a connection device and a rotating subassembly having the features disclosed herein. Advantageous embodiments of the invention are also the subject of the description and the figures.

A connection device according to the invention for a rotating subassembly of a motor vehicle is used to electrically connect a first electrical component, which is arranged in a hollow shaft of the subassembly, of the subassembly to a second electrical component, which is arranged outside the hollow shaft, of the subassembly. The connection device has a sleeve for arranging in a radial leadthrough of a wall of the hollow shaft and a wire-like conductor which is arranged in regions in the sleeve, wherein conductor ends projecting at edges of the sleeve form contact regions for contacting the first and second electrical components. Furthermore, the connection device has an electrically insulating covering which surrounds the conductor at least inside the sleeve and which is arranged between an outer side of the conductor and an inner side of the sleeve. In order for the connection element to withstand with respect to operating loads resulting from rotation, the conductor has a first undercut for producing a radially positive-locking connection between the conductor and the covering and the covering has a second undercut for producing a radially positive-locking connection between the covering and the sleeve.

The invention further relates to a rotating subassembly for a motor vehicle having a hollow shaft having at least one radial leadthrough, a first electrical component, which is arranged inside the hollow shaft, a second electrical component which is arranged outside the hollow shaft and at least one connection device according to the invention. In this case, the sleeve of the connection device is arranged in the leadthrough, a first conductor end, which is arranged in the hollow shaft, of the conductor is electrically connected to the first component and a second conductor end, which is arranged outside the hollow shaft, of the conductor is electrically connected to the second component. Preferably, the rotating subassembly is in the form of a rotor for a separately excited electric machine of the motor vehicle and further has a rotor core, through which the hollow shaft is guided and to which the hollow shaft is connected in a rotationally secure manner, and an energizable rotor winding, wherein the first electrical component at least partially comprises an energizing device for the rotor winding of the rotor and the second electrical component comprises the rotor winding. The separately excited electric machine may, for example, be a drive machine of the motor vehicle.

At high speeds of the electric machine, the rotating subassembly is exposed to high mechanical loads caused by centrifugal force. In particular, an electric interface between an interior and an exterior of the hollow shaft must be mechanically particularly stable in this case because, in the event of loss of the electrical connection between the two components, there is the risk of failure of the electric machine. This electric interface is formed by the at least one connection device. The connection device is a monolithic connection piece having the sleeve, the conductor and the covering. In particular, the subassembly has two connection devices, wherein a first connection device connects positive poles of the electrical components and a second connection device connects negative poles of the electrical components, and wherein the connection devices are arranged in a mutually symmetrical manner with respect to a rotation axis of the hollow shaft. The two identically formed connection devices are therefore arranged at the same axial height of the hollow shaft in a state radially opposite each other. The hollow shaft has at least one radially orientated leadthrough, that is to say, one which is orientated perpendicularly to the rotation axis. The leadthrough may, for example, be in the form of a hole or a through-opening in the wall of the hollow shaft and may have a round cross section.

The sleeve of the connection device is arranged in the leadthrough, wherein the sleeve is mechanically connected to the wall of the hollow shaft. The sleeve can be arranged, for example, in a state pressed in the leadthrough. The sleeve is particularly preferably screwed to the wall. To this end, the sleeve and the leadthrough have threads which correspond to each other. The sleeve is an elongate hollow member, which is, for example, cylindrical in regions, and is made from a material with a high strength, for example, steel. For example, the sleeve may be in the form of a hollow screw which has a screw head, which can be arranged outside the hollow shaft, with an external drive, in particular a hexagonal head for screwing the sleeve into the leadthrough of the hollow shaft. In order to mount the connection device on the hollow shaft, for example, the hollow screw is screwed into the leadthrough from the exterior and tightened with a corresponding tool via the screw head.

In this case, the sleeve surrounds an electrical conductor, for example, a wire piece. The wire piece may, for example, be made from copper. This conductor projects out of the sleeve at both sides so that the first conductor end which projects at a first edge of the sleeve is arranged inside the hollow shaft and can be contacted there with the first electrical component and the second conductor end which projects beyond a second edge of the sleeve is arranged outside the rotor shaft and can be contacted there with the second electrical component.

In this case, the conductor is secured in the sleeve via the covering and further electrically insulated with respect to the sleeve. The covering may, for example, be made from an injectable plastics material. The covering is particularly produced by over-molding the conductor in the sleeve, whereby a positive-locking or materially engaging connection between the conductor and the sleeve is further produced. In this case, the covering can also project at the edges of the sleeve and consequently project out of the sleeve in regions, wherein the conductor ends for forming the contact regions project at both sides at the covering. A projection of the insulator in the form of the insulating covering can be scaled freely in order to thereby provide a creep distance which is sufficient according to the electric nominal voltage. When an adhesive injection material is selected with low contraction behavior, this connection can also be oil-tight in order to avoid a cooling medium for cooling the rotating subassembly being introduced from the outside to the inside or to the outside from the inside. The mechanical connection between the conductor and the sleeve via the covering is produced at least partially via the undercuts. The conductor has the first undercut which is formed, for example, by a tapering region, which is arranged inside the sleeve, of the conductor. Consequently, the conductor has in the tapering region a reduced cross section. The injectable plastics material can flow around this tapering region, cure and fix the conductor in the radial direction at that location. Consequently, slippage of the conductor out of the covering as a result of centrifugal force is prevented by the first undercut.

In addition, the covering is connected to the sleeve in a positive-locking manner via a second undercut in order to prevent the covering, and therefore the conductor, from sliding out of the sleeve as a result of centrifugal force. The second undercut may, for example, be in the form of a projection region which projects above the first edge of the sleeve and which covers the first edge of the sleeve. As a result of the projection region, the first edge of the sleeve blocks a relative movement between the sleeve and the covering in the radial direction of centrifugal force. This second undercut can be produced in a particularly simple manner when the conductor is over-molded in the sleeve.

The embodiments which are set out with respect to the connection device according to the invention and the advantages thereof apply accordingly to the rotating subassembly according to the invention.

Further features of the invention emerge from the claims, the figures and the description of the figures. The features and feature combinations mentioned above in the description and the features and feature combinations mentioned below in the description of the Figures and/or shown in the Figures alone can be used not only in the combination set out but also in other combinations or alone.

The invention will now be discussed in more detail on the basis of a preferred exemplary embodiment and with reference to the drawings.

Other objects, advantages and novel features of the present invention will become apparent from the following detailed description of one or more preferred embodiments when considered in conjunction with the accompanying drawings.

DETAILED DESCRIPTION OF THE DRAWINGS

In the figures, identical and functionally identical elements are denoted by the same reference signs.

Figure 1:
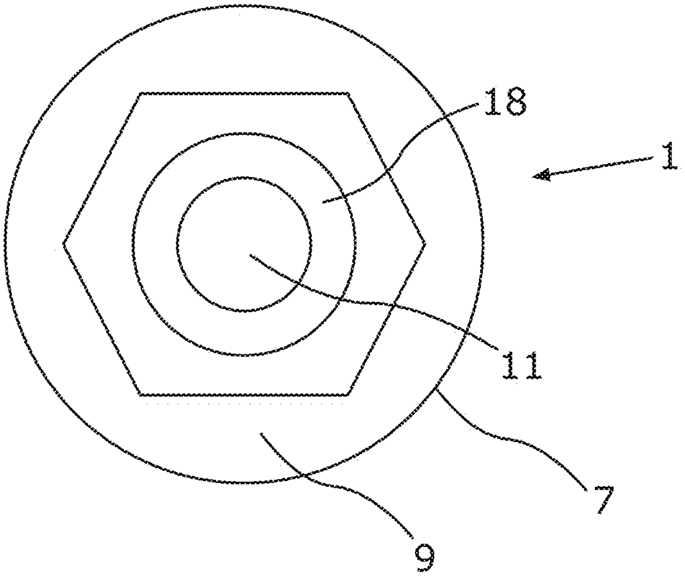
FIG. 1 shows a schematic illustration of an electrical connection device for a rotating subassembly as a plan view.
Figure 2:
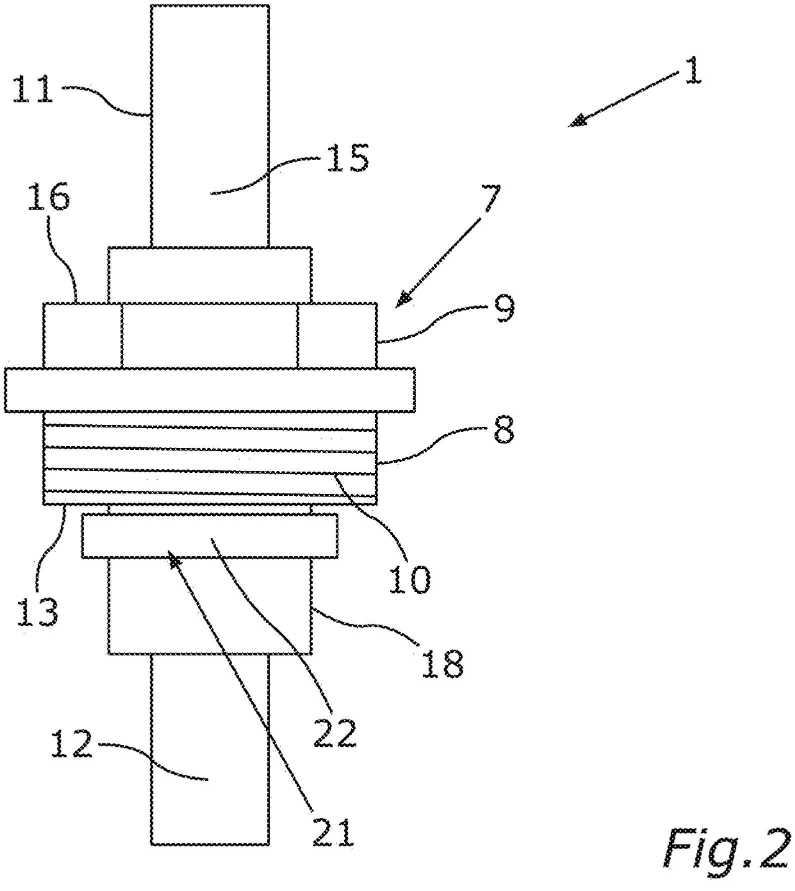
FIG. 2 shows a schematic illustration of the electrical connection device as a side view.
Figure 3:
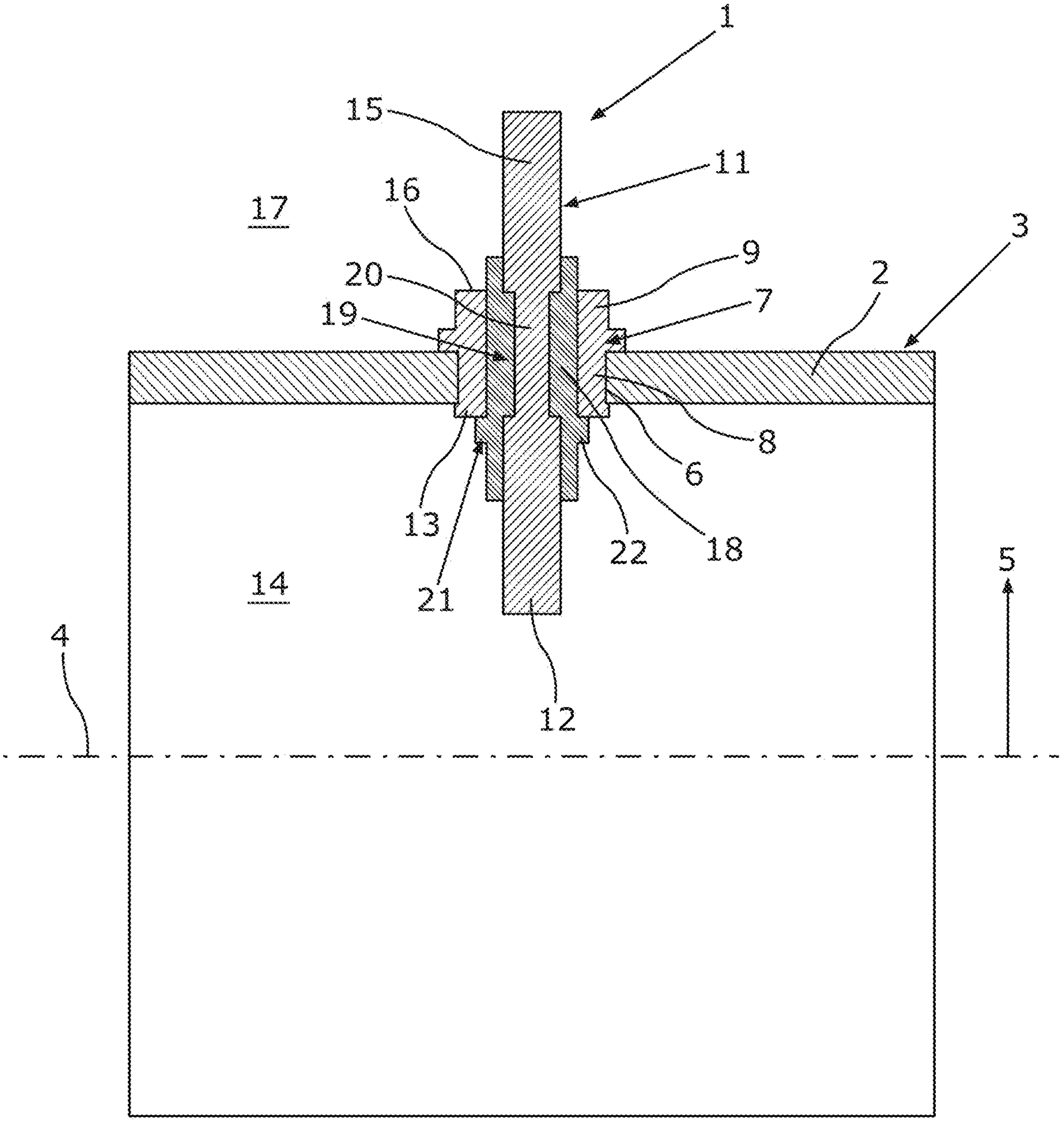
FIG. 3 shows a schematic sectioned view of the connection device which is arranged in a wall of a hollow shaft of the rotating subassembly.

FIGS. 1 and 2 show schematic illustrations of an electrical connection device 1 for a rotating subassembly of a motor vehicle which can be arranged, as shown in FIG. 3, in a wall 2 of a hollow shaft 3. The hollow shaft 3 may be a rotor shaft so that the rotating subassembly is a rotor of an electrical drive machine of the motor vehicle. A leadthrough 6 which is orientated perpendicularly to the rotation axis 4 in a radial direction 5 is arranged in the hollow-cylindrical wall 2 which extends along a rotation axis 4 of the hollow shaft 3. A first electrical component, for example, an energizing device, which is not shown here can be arranged in the hollow shaft 3 and is electrically connected via at least one connection device 1 to a second component, for example, a winding conductor of a rotor winding, outside the hollow shaft 3.

The connection device 1 has a sleeve 7 which is arranged in the leadthrough 6 and secured at that location. The sleeve 7 may be, for example, a hexagonal hollow screw having a shaft 8 and a screw head 9. The shaft 8 can have an external thread 10, via which the sleeve 7 can be screwed into the leadthrough 6 from outside. The screw head 9 is arranged outside the hollow shaft 3 in this case and abuts the wall 2. An electrical conductor 11, for example, a copper wire, is guided through the sleeve 7 in a radial direction 5, wherein a first conductor end 12 projects beyond a first edge 13 of the sleeve 7 and projects into an interior 14 of the hollow shaft 3. The first conductor end 12 forms a first contact location for contacting the first component. A second conductor end 15 projects beyond a second edge 16 of the sleeve 7 and consequently projects into a surrounding area 17 of the hollow shaft 3. The second conductor end 15 forms a second contact location for contacting the second component.

The conductor 11 is mechanically connected via a covering 18 to the sleeve 7. The covering 18 is made from an electrically insulating material and electrically insulates the conductor 11 with respect to the metal sleeve 7. In particular, the covering 18 is injection-molded into an empty space between an outer side of the conductor 11 and an inner side of the sleeve 7 and consequently connects the sleeve 7 and the conductor 11 in a materially engaging manner. In addition, the covering 18 and the conductor 11 and the covering 18 and the sleeve 7 are connected in a radial direction 5 in a positive-locking manner in order to prevent the covering 18, sleeve 7 and conductor 11 from being released from each other as a result of centrifugal force. To this end, the conductor 11 has a first undercut 19 in the form of a tapering region 20. The electrically insulating material flows around this tapering region 20 during injection into the sleeve 7 and consequently forms a positive-locking connection with the conductor 11. Furthermore, the covering 18 has a second undercut 21 in the form of a projection 22. The projection 22 covers the first edge 13 of the sleeve 7 and is consequently retained in the sleeve 7 in the event of centrifugal forces acting on the covering 18.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A connection device for a rotating subassembly of a motor vehicle for electrically connecting a first electrical component of the subassembly, which is arranged in a hollow shaft of the subassembly, to a second electrical component of the subassembly, which is arranged outside the hollow shaft, the connection device comprising:

a sleeve configured to be arranged in a radial leadthrough of a wall of the hollow shaft;

a wire-like conductor arranged in regions in the sleeve, wherein conductor ends projecting at edges of the sleeve form contact regions configured to contact the first and second electrical components; and an electrically insulating covering that surrounds the conductor at least inside the sleeve, and which is arranged between an outer side of the conductor and an inner side of the sleeve, wherein, in order for the connection device to withstand with respect to operating loads resulting from rotation, the conductor has a first undercut configured to produce a radially positive-locking connection between the conductor and the covering, and the covering has a second undercut configured to produce a radially positive-locking connection between the covering and the sleeve.

2. The connection device according to claim 1, wherein an outer side of the sleeve comprises an external thread configured to screw into the leadthrough of the hollow shaft.

3. The connection device according to claim 2, wherein the sleeve is in a form of a hollow screw, which has a screw head that is configured to be arranged outside the hollow shaft, for screwing the sleeve into the leadthrough of the hollow shaft.

4. The connection device according to claim 1, wherein the covering is produced by injection-molding in the sleeve and over-molding the conductor, whereby at least one materially engaging connection between the conductor and the sleeve is produced.

5. The connection device according to claim 1, wherein the second undercut is in a form of a projection region that projects above an edge of the sleeve, which is configured to be arranged in an interior of the hollow shaft, and which covers the edge of the sleeve.

6. The connection device according to claim 1, wherein the first undercut is formed by a tapering region of the conductor, which is arranged inside the sleeve.

7. The rotating subassembly for the motor vehicle comprising:

the hollow shaft having the at least one radial leadthrough;

the first electrical component, arranged inside the hollow shaft;

the second electrical component arranged outside the hollow shaft; and at least the one connection device according to claim 1, wherein the sleeve is arranged in the at least one leadthrough, a first conductor end of the conductor, which is arranged in the hollow shaft, is electrically connected to the first component, and a second conductor end of the conductor, which is arranged outside the hollow shaft, is electrically connected to the second component.

8. The rotating subassembly according to claim 7, comprising:

two connection devices, wherein a first connection device connects positive poles of the electrical components, and a second connection device connects negative poles of the electrical components, and wherein the connection devices are arranged in a mutually symmetrical manner with respect to a rotation axis of the hollow shaft.

9. The rotating subassembly according to claim 7, wherein the at least one leadthrough has an inner thread in the hollow shaft.

10. The rotating subassembly according to claim 7, wherein the rotating subassembly is in a form of a rotor for a separately excited electric machine of the motor vehicle, and further comprises:

a rotor core, through which the hollow shaft is guided, and to which the hollow shaft is connected in a rotationally secure manner; and an energizable rotor winding, wherein the first electrical component at least partially comprises an energizing device for the rotor winding of the rotor and the second electrical component comprises the rotor winding.

* * * * *